United States Patent [19]

Löhr et al.

[11] Patent Number: 4,641,872
[45] Date of Patent: Feb. 10, 1987

[54] COLLISION DAMPER HAVING A DAMPING PISTON AND A DEFORMABLE TUBE CONNECTED THERETO

[75] Inventors: Karl-Heinz Löhr, Eitorf; Ewald Kohberg, Eitorf-Irlenborn; Werner Kuchheuser, Windeck-Stromberg; Wolfgang Dorhmann, Eitorf-Irlenborn, all of Fed. Rep. of Germany

[73] Assignee: Boge GmbH, Eitorf, Fed. Rep. of Germany

[21] Appl. No.: 736,803

[22] Filed: May 22, 1985

[30] Foreign Application Priority Data

May 23, 1984 [DE] Fed. Rep. of Germany ....... 3419165

[51] Int. Cl.⁴ ............................................. A47C 7/14
[52] U.S. Cl. ................................... 293/133; 293/134; 188/376
[58] Field of Search ............... 293/102, 107, 110, 132, 293/133, 134; 188/371, 372, 374, 376, 377; 280/784; 267/139, 64.15

[56] References Cited

U.S. PATENT DOCUMENTS

| 2,997,325 | 8/1961 | Peterson | 293/134 X |
| 3,801,087 | 4/1974 | Akaike et al. | 293/134 X |
| 3,822,907 | 7/1974 | Appel et al. | 293/133 |
| 3,887,223 | 6/1975 | Bez | 293/133 |
| 3,888,502 | 6/1975 | Felzer et al. | 296/31 P X |
| 3,922,014 | 11/1975 | Hinderks | 188/371 X |
| 3,944,270 | 3/1976 | Kreuzer | 267/139 X |
| 3,993,294 | 11/1976 | Wossner et al. | 293/134 X |
| 4,272,114 | 6/1981 | Hirano et al. | 188/377 X |
| 4,426,109 | 1/1984 | Fike, Jr. | 267/139 X |
| 4,431,221 | 2/1984 | Jahnle | 188/377 X |

FOREIGN PATENT DOCUMENTS

| 2163921 | 7/1972 | Fed. Rep. of Germany . |
| 2222885 | 11/1973 | Fed. Rep. of Germany ...... 280/784 |
| 2841027 | 3/1980 | Fed. Rep. of Germany . |
| 1374587 | 11/1974 | United Kingdom . |

Primary Examiner—Robert B. Reeves
Assistant Examiner—Russell D. Stormer
Attorney, Agent, or Firm—Nils H. Ljungman

[57] ABSTRACT

An impact damper which is equipped with an economical, cost-effective work piston, on which not only can a weight reduction be made, but also a substantial simplification in manufacture can be achieved. This impact damper is also designed to be deformable instantaneously upon collision with an obstacle when the force of the collision exceeds a predetermined range. The work piston is designed as a tubular body closed on a side facing a fluid containing chamber, and is provided with a breaking or buckling point, whereby energies can readily be absorbed, even at relatively high impact velocities.

19 Claims, 4 Drawing Figures

COLLISION DAMPER HAVING A DAMPING PISTON AND A DEFORMABLE TUBE CONNECTED THERETO

BACKGROUND OF THE INVENTION

1. Field of the Invention

The invention relates to impact dampers and, more particularly, to impact dampers for motor vehicles.

2. Description of the Prior Art

Impact dampers are known such as in German Patent Publication Nos. DE-PS 28 41 027 and DE-AS 21 63 921, and British Patent No. 1,374,587, which have two tubes that can be inserted one into the other. A damping piston, having a piston rod connected thereto at one end, projects out of the inner tube, the end of which is connected with a base of an external tube that slides in a guided manner on the internal tube. A disadvantage of such an embodiment is that the manufacture of the piston rod, together with the corresponding piston, is very expensive. In addition, the piston and the piston rod must be manufactured from solid material. Therefore, these components weigh a great deal and have a detrimental effect on general vehicular performance. Moreover, an additional bracket or similar apparatus is required for the connection of the piston rod to the external tube, whereby the components must specifically have an appropriate tolerance in relation to the parts holding them.

OBJECT OF THE INVENTION

The object of the invention is to equip an impact damper with an economical, cost-effective work piston, on which not only can a weight reduction be made, but also a substantial simplification in manufacture can be achieved. This impact damper is deformable immediately upon collision with an obstacle when the force of the collision exceeds a predetermined range.

SUMMARY OF THE INVENTION

The object is realized by the invention, in that the invention resides in a deformation tube which is disposed within an outer tubular cylinder and which deforms upon impact. The deformation tube is preferably disposed adjacent to the bumper of the vehicle. A closed end of the deformation tube is held in place by inwardly-curving projections on an end of a second, internal tube that is fitted within the outer tube. The projections at the end of the inner tube have a diameter which is greater than that of the deformation tube, so that the deformation tube may freely move within the inner tube, up to a distance corresponding to the length of the deformation tube. The end of the deformation tube opposite the end held by the projections of the inner tube is rigidly connected to the outer tubular cylinder.

An advantage of such an embodiment is that the expensive piston rod described in the prior art is replaced by a tubular component. The simplification in manufacture makes possible a significant weight reduction without adversely affecting the strength. In addition, the design of the deformation tube can be configured so that a deformation can be achieved, together with an energy absorption, even at rather high impact velocities.

According to an important characteristic of the invention, the work piston is closed on the side facing a fluid containing chamber. It is thereby possible that the work piston and the deformation tube are designed as a one-piece unit. This is made possible, without any problems, by an appropriate design configuration and layout of these components. However, solutions are also quite conceivable in which the work piston and the deformation tube are rigidly and inseparably connected with one another. These solutions are always possible if the two component parts are manufactured separately, each from different processes, and then rigidly connected to one another. However, such a rigid connection is not absolutely necessary, since in the rest position, the pressure in the fluid containing chamber adjacent to the work piston produces an axial force closing between the work piston and the deformation tube, so that support exists even without a corresponding connection.

An important embodiment provides that the work piston be configured as a deep-drawn part, or as a cold-extruded part, in one piece. To this end, favorable fabrication processes can be advantageously used for the manufacture of the piece from sheet metal or from plastic.

In an alternative embodiment of the invention, the work piston and/or the deformation tube are made of sheet metal or plastic.

Another important feature of the invention is that the deformation tube is essentially cylindrical and runs coaxial to the axis of rotation. Since the deformation tube simultaneously serves as a buckling point in its narrow region, energies can readily be absorbed even at relatively high impact velocities.

In a preferred embodiment, the breaking or buckling point in the narrow region of the deformation tube is preferably designed as a depression running over the circumference, or as partial indentations distributed over portions of the circumference.

BRIEF DESCRIPTION OF THE DRAWINGS

Preferred embodiments according to the invention are schematically illustrated in the drawings, wherein.

DESCRIPTION OF THE PREFERRED EMBODIMENTS

Figure 1:
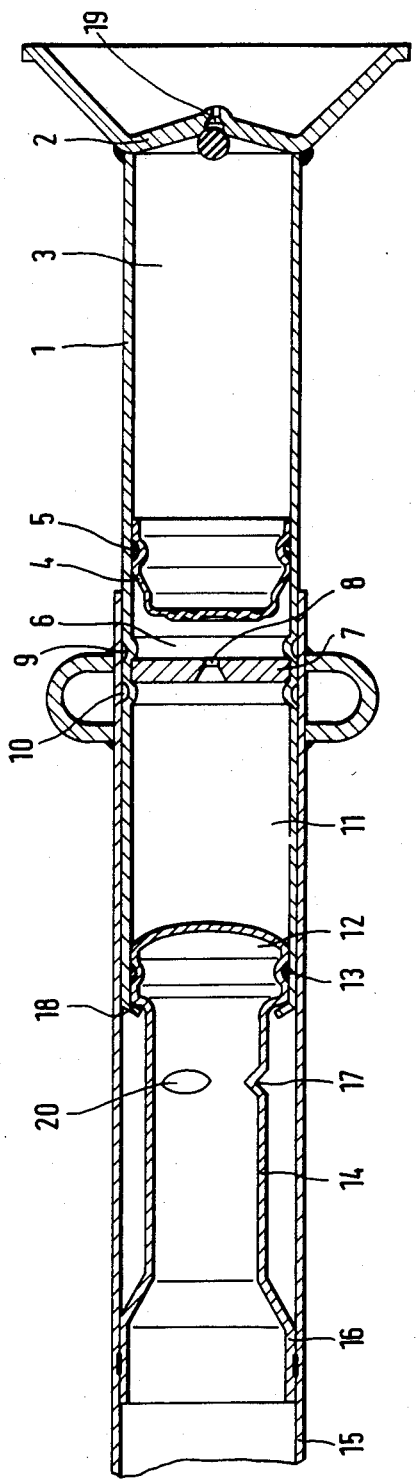
FIG. 1 shows an impact absorber in axial longitudinal section, in which the work piston and the deformation tube are designed as unit parts.

The impact absorber illustrated in FIG. 1 exhibits an internal tube 1 closed by a damper bottom or end 2. Starting from the damper bottom 2 and moving in sequence, there are: a gas chamber 3 enclosing a gas cushion under high pressure; a separating piston 4, which moves in a guided manner and is sealed in the internal tube 1 by means of a gasket 5; a first fluid chamber 6; a partition 7, provided with a throttle opening 8, located between a bead 9 and another bead 10 in the internal tube 1; and a second fluid chamber 11. A work piston 12, which moves in a guided manner in the internal tube 1 and is sealed against the inner jacket of the internal tube 1 by a gasket 13, is designed as a unit with the deformation tube 14, its narrow region projecting out of the internal tube 1 and being fixed so that it is axially immovable in the guided movable external tube 15. The end region 16, supported on an extremity portion of the external tube 15, is connected with the external tube 15 in a fixed and immovable manner by means of a welded joint.

In the vicinity of the deformation tube 14, the work piston 12 has a breaking or buckling point 17, which in this embodiment, is formed by partial indentations 20.

The work piston 12 is impermeable, and the deformation tube 14 projects unsealed and unguided out of the internal tube 1 in such a manner that, in the starting position illustrated in FIG. 1, the closed end or interface portion of the work piston 12 is held in place by inwardly-curving projections 18, and the deformable tube 14 has a maximum diametral portion which moves freely inside said inwardly curving projections 18.

In the damper bottom 2 there is a charging opening 19 for charging with gas. The internal tube 1 and the external tube 15 are connected when installed with parts of a vehicle, for example the external tube 15 with a vehicle bumper, and the internal tube 1 and the damper bottom 2 with a vehicle body. When the bumper collides with an obstacle, the work piston 12 is pushed toward the partition 7, the fluid in the second fluid chamber 11 being displaced through the throttle opening 8 into the first fluid chamber 6 and in turn compressing the gas cushion in the gas chamber 3. Thereby, the vehicle impact damper produces hydraulic and pneumatic braking forces. The damping forces are principally caused by the flow resistance of the throttle opening 8, and the level of the damping forces is determined by the size and configuration of the throttle opening 8. The fluid displaced into the first fluid chamber 6 causes a displacement of the separating piston 4 toward the damper bottom 2, thereby reducing the size of the gas chamber 3 and resulting in a pressure increase of the gas in the gas chamber 3. This increased gas pressure, as well as its initial pressure and its initial volume, determines the magnitude of the pneumatic forces. When the force on the bumper exceeds a predetermined range, the deformation tube 14 begins to deform immediately upon impact.

Figure 2:
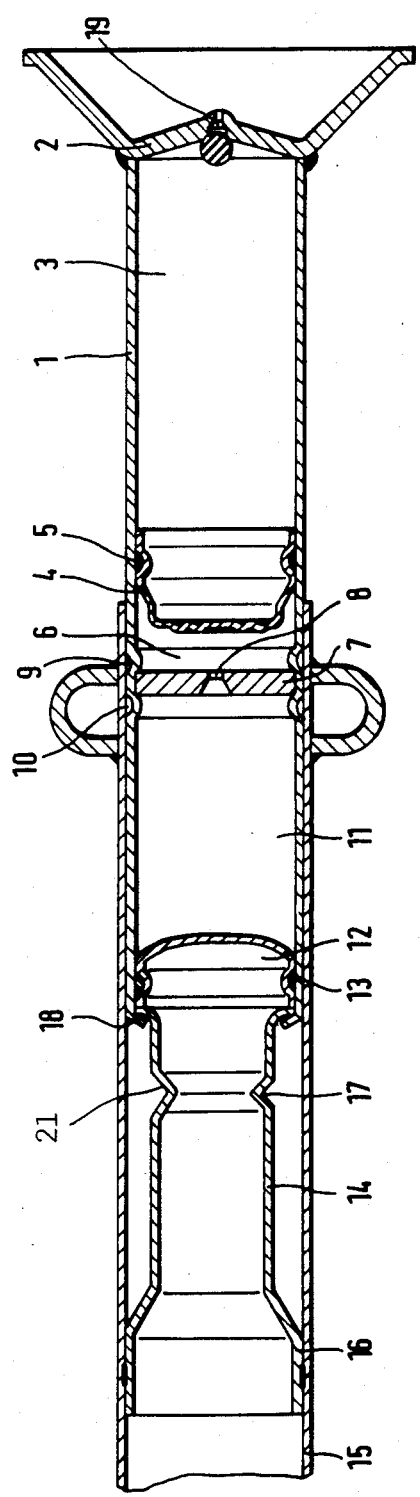
FIG. 2 shows another embodiment, in which the work piston and the deformation tube are designed as two parts.

FIG. 2 shows another embodiment, with the distinction that the work piston 12 is manufactured as a deep-drawn part from sheet metal or plastic, with the deformation tube 14 being designed as a second component. Both parts are braced in the axial direction by means of the pressure prevailing in the fluid chambers 6 and 11, and in the gas chamber 3. In this embodiment, the breaking point 17 of the deformation tube 14 is designed as a circumferential depression 21.

Figure 3:
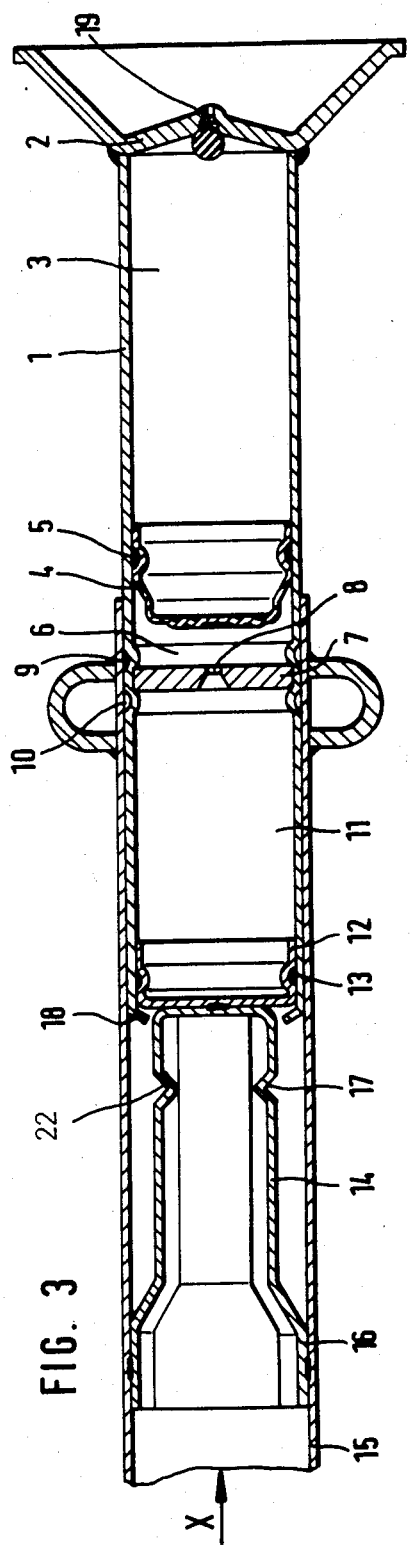
FIG. 3 shows a work piston and a deformation tube which are rigidly and inseparably connected with one another.
Figure 4:
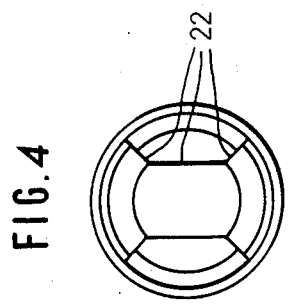
FIG. 4 shows an end view of the deformation tube illustrated in FIG. 3.

FIG. 3 shows yet another embodiment, in which the work piston 12 is rigidly and inseparably connected with its closed bottom to the end surface of the deformation tube 14. Such a connection can be made, for example, by spot welding. The breaking point 17 of the deformation tube 14 is shown as having flattened lateral surfaces 22, and is designed so that there can be an additional strengthening of the deformation tube 14. FIG. 4 shows an end view of the deformation tube 14 illustrated in FIG. 3 (shown from the direction of an arrow X in FIG. 3). The work piston 12 has its open region facing the second fluid chamber 11, which is unimportant with regard to its operation.

The invention as described hereinabove in the context of the preferred embodiments is not to be taken as limited to all of the provided details thereof, since modifications and variations thereof may be made without departing from the spirit and scope of the invention.

What is claimed is:

1. An impact damper for a motor vehicle having outer tubular means and inner work piston means, said work piston means being disposed within a portion of said outer tubular means and being firmly attached at one end thereof at an extremity portion of said outer tubular means;

means for interacting with a relative movement of said work piston means for transferring forces produced during impact with said outer tubular means to said work piston means;

fluid means disposed for transferring at least a portion of said forces upon said work piston means to said fluid means during impact for slowing down said motor vehicle during a collision;

said work piston means having an interface portion at an end opposite said end attached to said extremity portion of said outer tubular means for interfacing with said fluid means;

said fluid means comprising an internal tube means defining a hydraulic liquid containing chamber, said liquid therein making contact with said interfacing portion;

said liquid containing chamber having throttle means therein for throttling liquid flow within said chamber;

means for retaining said work piston means in a predetermined position relative to said fluid means and said outer tubular means at times when said forces of impact are not present;

said means for retaining said work piston means being disposed such that said work piston means is movable along a substantial portion of said work piston's length with respect to said retaining means; and said work piston means including a deformable tube having means for mechanically deforming and shortening when forces transferring from said means for interacting exceed a predetermined range.

2. The impact damper according to claim 1 wherein said means for retaining comprises inward projections from said outer tubular means about said interface portion of said work piston means.

3. The impact damper according to claim 2 wherein said deformable tube means has a maximum diametral portion which moves freely inside said inward projections.

4. The impact damper according to claim 1, wherein said internal tube means further defines a gas filled chamber adjacent to an end of said liquid containing chamber opposite said interfacing portion, a movable partition being disposed between said gas filled chamber and said liquid containing chamber for transferring forces between said liquid containing chamber and said gas filled chamber.

5. The impact damper according to claim 3 wherein said interface portion comprises head means held by said inward projections.

6. The impact damper according to claim 1 wherein said deforming means means includes means for initiating deformation.

7. The impact damper according to claim 6 wherein said deformation initiating means comprises indentations distributed around the circumference.

8. The impact damper according to claim 6 wherein said deformation initiating means comprises a groove running around the circumference.

9. The impact damper according to claim 1 wherein said work piston deformable tube means comprises sheet metal.

10. The impact damper according to claim 2 wherein said work piston deformable tube means comprises sheet metal.

11. The impact damper according to claim 6 wherein said deformation initiating means comprises sheet metal.

12. The impact damper according to claim 1 wherein said interface portion closes said work piston means to fluid from said fluid means.

13. The impact damper according to claim 3 wherein said interface portion closes said work piston means to fluid from said fluid means.

14. The impact damper according to claim 1 wherein said work piston means, said interface portion and said deformable tube means comprise a single unitary structure.

15. The impact damper according to claim 6 wherein said work piston means, said interface portion and said deformable tube means comprise a single unitary structure.

16. The impact damper according to claim 1 wherein said work piston means, said interface portion and said deformable tube means comprise separate parts being rigidly connected to one another.

17. The impact damper according to claim 1 wherein said deformable tube means comprises plastic.

18. The impact damper according to claim 1 wherein said work piston means is a one-piece deep-drawn part.

19. The impact damper according to claim 3 wherein said deformable tube means is substantially cylindrical and is coaxial to a longitudinal axis of said impact damper.

* * * * *